May 12, 1925.
A. B. HALE
1,537,603
METHOD AND APPARATUS FOR MARKING GRADED CITRUS FRUIT
Filed Nov. 26, 1924    2 Sheets-Sheet 1
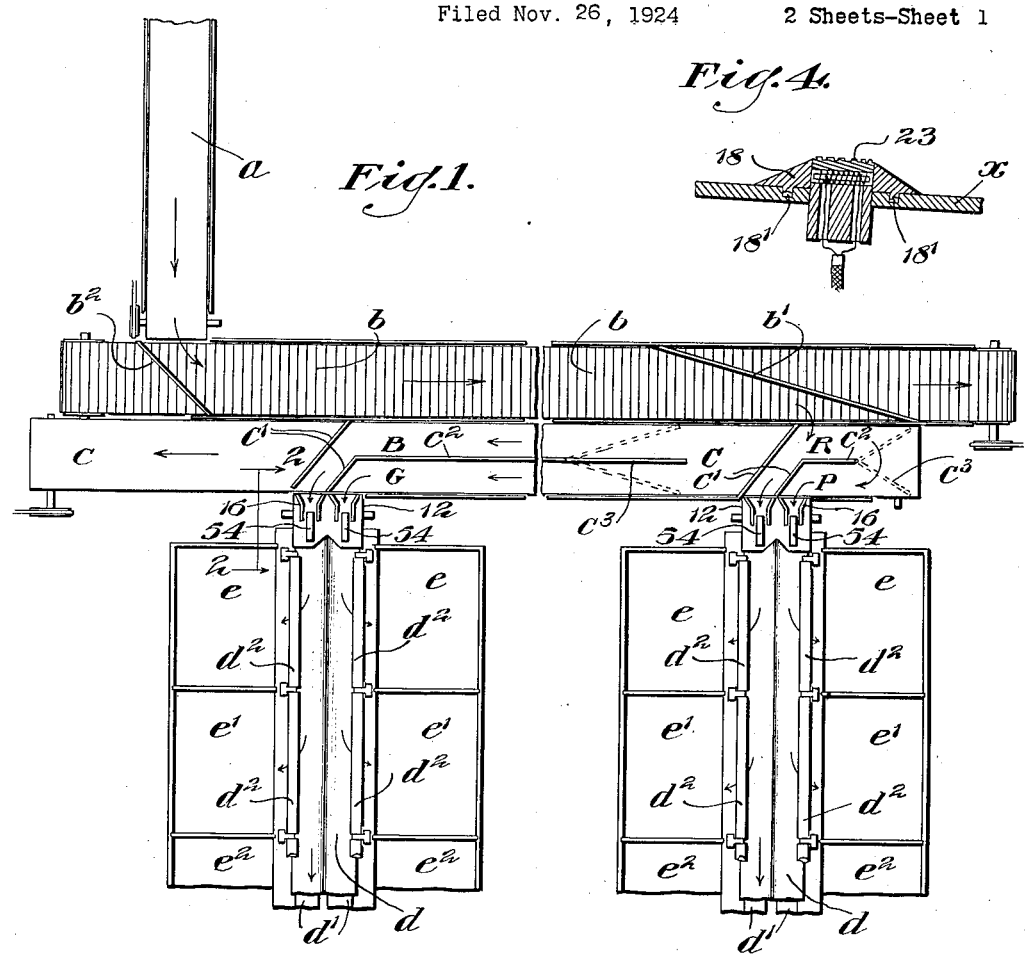
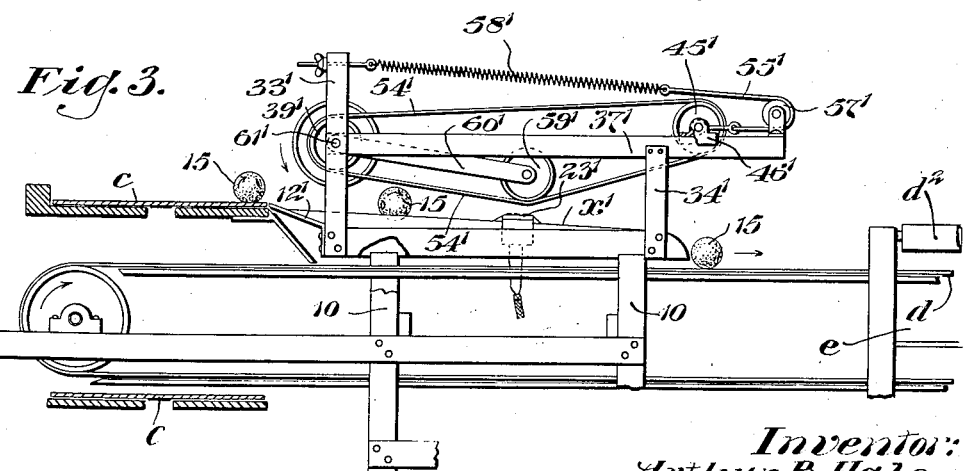
Inventor:
Arthur B. Hale
by his Attorney.

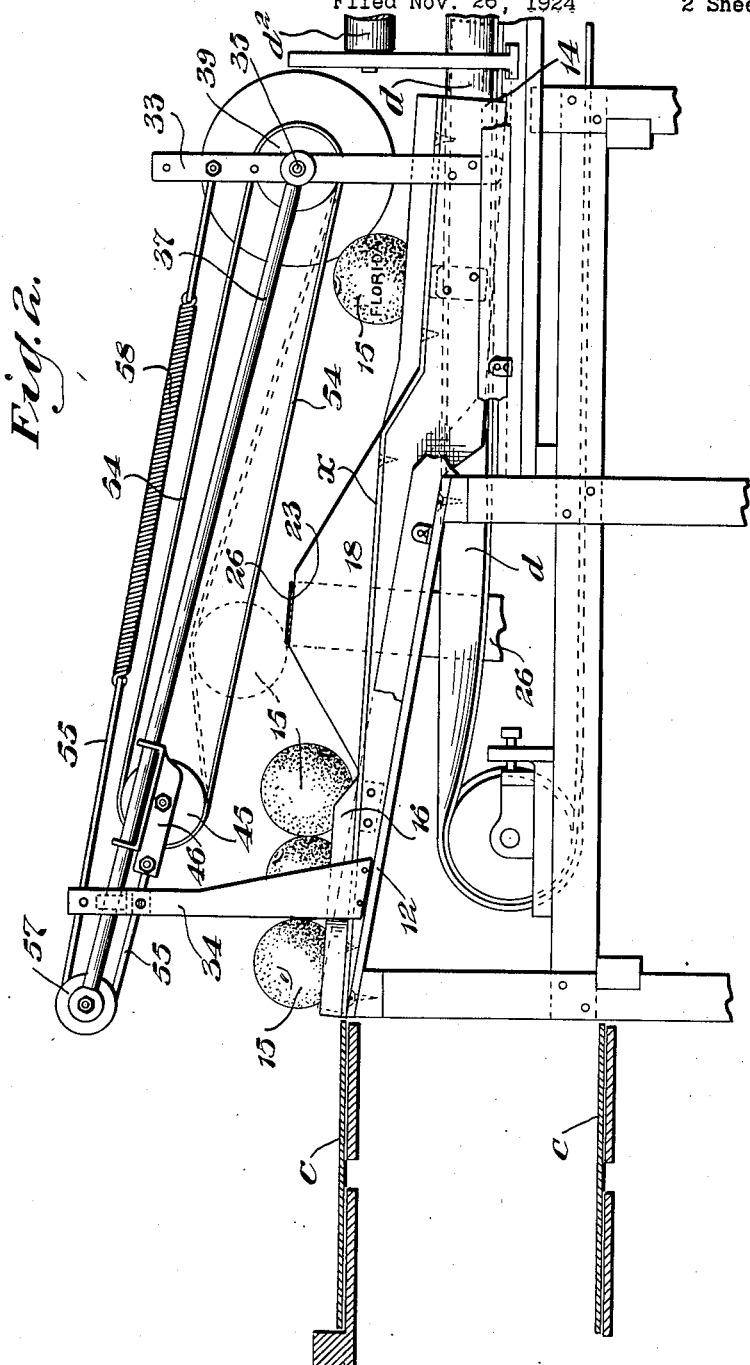

Patented May 12, 1925.

1,537,603

UNITED STATES PATENT OFFICE.

ARTHUR B. HALE, OF TAMPA, FLORIDA, ASSIGNOR, BY MESNE ASSIGNMENTS, TO F. J. SÉVIGNÉ MACHINE COMPANY, OF NASHUA, NEW HAMPSHIRE, A CORPORATION OF NEW HAMPSHIRE.

METHOD AND APPARATUS FOR MARKING GRADED CITROUS FRUIT.

Application filed November 26, 1924. Serial No. 752,388.

*To all whom it may concern:*

Be it known that I, ARTHUR B. HALE, a citizen of the United States, and resident of Tampa, in the county of Hillsborough and State of Florida, have invented certain new and useful Improvements in Methods and Apparatus for Marking Graded Citrous Fruit, of which the following is a specification.

This invention relates to the treatment of fruit, especially citrous fruit such as oranges and grape fruit, so as to mark their surfaces with identifying trade-marks, names or words. To facilitate an understanding of the reasons for, and the advantages of, the present invention, the customary practice will first be explained.

A fruit packing house equipment usually has one or more units, each unit including a washer to which the fruit is delivered from the pickers' boxes, a dryer, a polisher, a grader and a sizer through which the fruit (which for the sake of brevity and not of limitation will be hereinafter referred to as oranges) continuously passes in the successive order named. When a marking machine has been employed, it has been customary to locate it between the polisher and the grader, and consequently all of the oranges, regardless of grade or size, are marked alike.

The members of the unit called the grader consists of mechanism or apparatus hereinafter explained, alongside of which a number of attendants stand or sit and examine the passing oranges and pick up the proper ones and deposit them on a spaced off conveyor, from which the oranges are delivered to a plurality of other members called sizers from which the different sizes escape into receptacles called bins where other attendants stand and pick up the oranges and wrap them and pack them in boxes to be shipped.

The principal object of the present invention is to enable citrous fruit to be clearly and properly marked by causing it to travel, in graded condition, past mechanism for printing or marking it, and then through mechanism which delivers the fruit in assorted sizes to position where they can be wrapped, whereby no handling of the marked fruit is required until said fruit, in assorted sizes, reaches position to be wrapped and packed.

With the above-mentioned object in view, and others hereinafter explained, the invention consists in the method and in the apparatus substantially as hereinafter described and pointed out in the claims.

Of the accompanying drawings:

Figure 1 is a plan view of portions of a well-known packing house unit, and of marking machines in their relative positions to attain the objects of the invention.

Figure 2 is an elevation and part section on line 2—2 of Figure 1, on a much larger scale.

Figure 3 is a view similar to Figure 2, illustrating a slightly different form of marking machine.

Figure 4 is a sectional detail hereinafter described.

Similar reference characters indicate similar parts in all of the views, letters being employed to indicate those portions or members of the unit which are or may be of well-known form, and numerals being employed for the marking machine.

Referring first to Figure 1, a belt $a$ conveys the fruit from the polisher (not shown) to the grader conveyor $b$ which may be a belt or an endless series of rolls and above which are deflectors $b'$ $b^2$. Close to and parallel with the conveyor $b$ and traveling in an opposite or reverse direction, is a belt conveyor $c$ above which are deflectors $c'$, division boards $c^2$, and hinged gates $c^3$. In the use of this well-known form or type of grader, a number of attendants employed according to their skill and speed capacity, occupy positions along the unobstructed side of the conveyor $b$ and examine the oranges not as to size but as to quality or grade, and manually transfer the selected ones to certain spaces on the belt $c$. For instance those which have such appearance as to be known or classed as "Bright", "Golden", or "Russet", are transferred, respectively, to the spaces lettered B, G, R, in Figure 1. And the plain ones may, for instance, be deposited in the space P. The deflectors $c'$ direct the different grades of oranges to the throats of the sizers, of which four are illustrated, each throat comprising mainly an inclined board or table 12 having a delivery end or portion 14 (Figs. 1 and 2) over which the oranges are rolled to the sizers.

Before describing the markers one of which is preferably employed at each of the four throats indicated, the illustrated and well-known form of sizers will be briefly described.

Figure 1 illustrates portions of two carrier belts $d$, one extending from each pair of throats and travelling in the direction indicated by arrows. Each belt $d$ travels along two guide boards $d'$ which are inclined laterally relatively to each other so that the middle of the belt is higher than its edges to cause the oranges to gravitate toward spaces underneath strip or roll barriers $d^2$, said spaces being of gradually or step-by-step increasing width so that the smaller oranges will escape into a bin $e$, the next larger into a bin $e'$, the next into a bin $e^2$, and so on. As illustrated by Figure 1 there are four rows of bins from which attendants are to pick the oranges and wrap and pack them. All of the bins of each row will receive oranges of one selected grade, as "Bright", "Golden", "Russet", but different sizes of each grade will escape into different bins. Therefore, by marking the oranges at the throats of the sizers, instead of, as heretofore, before grading, each grade regardless of size can have its grade printed thereon. Other advantages will be explained hereinafter.

The marking machine selected for illustration by Figure 2 is substantially the same as that shown, described and claimed in my application filed April 8, 1924, Serial No. 704,978, to which reference may be had if further explanation than the following is desired. Said machine comprises mechanism which is preferably removably mounted on or above the table 12 and delivery portion 14 of the sizer throat, to act on the passing fruit 15 guided by strips 16. Said mechanism includes a riser 18 having a die 23 at its apex over which an ink-carrying ribbon 26 is intermittently fed. These last mentioned parts are supported by a removably mounted strip or platform X to which standards 33, 34, are secured. Pivoted to the standards 33, at 35, is an arm or a pair of arms 37 the other ends of which are adjustably supported by the standards 34. Carried by a driven pulley 39 and by a pulley 45 mounted in a carriage 46 slidable on the arms 37 is a belt 54. A strap 55 connected to the carriage 46 passes around a pulley 57 and is connected by a spring 58 to the standards 33. The mechanism just described bears the same reference numerals as employed in the application above referred to. For present purposes, since no specific type of marker is claimed herein, it is sufficient to explain that the oranges 15 are rolled by the belt 54 in close succession over the ribbon which extends transversely across the die 23, and are printed or marked, and then pass to the sizer $d$, $d^2$.

A somewhat different arrangement and form of marker is illustrated by Figure 3 in which the sizer belt $d$ extends from the space between the upper and lower runs of the grader belt $c$. Standards 10 extend up past the sides of belt $d$ and removably support a platform X' having a lip 12' extending up to the edge of the grader belt $c$. Carried by said platform is an electrically heated die 23' over which an ink-carrying ribbon may pass in a manner similar to that shown by Figure 2. Rising from the removable platform X' are standards 33', 34', which, in turn, support a bar 37' on which a carriage 46' carrying a pulley 45' is slidably mounted. The belt 54' to roll the fruit 15 over the heated die (and the ink ribbon when one is employed) is mounted on a pulley 39' and the pulley 45', being held yieldingly taut by a strap 55' connected to the carriage 46' and passing around a pulley 57' and connected by a spring 58' to the standard 33'. The lower run of the belt 54' passes under a gravitating pulley 59' carried by an arm 60' pivotally supported at 61'.

Instead of mounting all of the parts of the marker so as to be removable as a unit, it will sometimes be sufficient, for the purposes presently explained, to only remove the die and ribbon and heater when the latter are employed. Such an arrangement is illustrated by Figure 4 in which the construction may be assumed to be substantially the same as in Figure 2 excepting that the riser 18 has dowels 18' fitting holes in the platform or runway X, said riser having a recess in which the die 23 is mounted with an electric heater below it, the structure being such that the riser with its die and heater can be removed as a unit leaving the runway X unobstructed for the free passage of fruit when, for any reason, the fruit passing to one or another of the several sizers is not to be marked. When an ink ribbon is employed with this last mentioned structure, and when the riser and die are removed, the ribbon can simply be detached or otherwise put out of commission.

The reason for providing a marker at the throat of the sizer, which marker either as an entirety (Figs. 2 and 3) or the essential part thereof (Fig. 4) can be displaced or removed without disturbing the platform or runway below it, is that sometimes it may be desirable to send one or more of the grades to the sizers without being marked, while continuing to mark the other grades. In other words, any grade can be marked or, by a quickly effected change, allowed to pass to its sizer without any marking.

A number of advantages are obtained by having an individual marker at the throat or entrance of each of a plurality of sizers to print the fruit after the grading is effected, viz:—As the marking is effected after grading instead of before, there is no opportunity for the marks to be blurred by the handling which the grader attendants necessarily employ to select and transfer the individual oranges from the belt *b* to the proper spaces above belt *c*. And since the fruit reaches position in front of the grading attendants un-marked, there is no liability of any mark being mistaken by an attendant (who necessarily works as rapidly as is humanly possible) for a blemish that will cause him to discard a good orange; nor could he be confused by the color of the marking so as to grade an orange wrongly.

An important feature of the invention is that it provides for marking each grade separately so that grades can be marked respectively "Bright", "Golden", "Russet", and also with some other mark such as a trade-mark. For instance, each and every orange reaching a sizer may be marked "Sealdsweet Russet" or "Sealdsweet Bright", and then all the oranges of each of such grades are automatically divided into proper sizes for wrapping and packing. This result could not be accomplished when the fruit is marked before grading because all of the grades would be marked alike.

When, as heretofore, marking is effected before grading, the number of oranges delivered to the grader (through the marking machine) is so great that a large and heavy machine is required to do the marking. Such machine is costly and occupies considerable room. A machine which is required to mark only the relatively small number of oranges passing to each sizer is so small that it is readily mounted at the throat of each sizer, as described, without adding anything to the floor space occupied by the entire unit, or requiring any shifting of the relative positions of the different conveyors of the unit.

From the above description it will now be understood that all oranges which reach a particular bin *e* for wrapping and packing will be practically uniform as to size as well as marked alike with the grades such as "Bright", "Golden" or "Russet" and also with a selected trade-mark such as "Sealdsweet" or any other word or name.

Having now described my invention, I claim:

1. The method of identifying different sizes of fruit by uniform indications of the grades thereof, consisting in first sorting the fruit into different grades, then marking all of each grade uniformly, and then separating those of each grade into different sizes.

2. The method of providing fruit of different sizes with uniform indications of its grade and source or origin, consisting in first grading the fruit, then uniformly marking all of each grade distinctively, and then dividing those of each grade into different sizes.

3. A fruit marker having a grader to deliver fruit thereto, and a sizer in position to receive the fruit directly from the marker.

4. The combination with a fruit grader and a plurality of sizers for receiving the fruit from the grader, of an individual marker at the throat of each sizer.

5. The combination with a fruit grader and a plurality of sizers and a runway leading from the grader to each sizer, of means for marking the fruit passing over each runway, said marking means being removable.

6. Apparatus for producing graded fruit in different sizes with the grades marked thereon, comprising a grader, a plurality of sizers, and a corresponding plurality of markers, one marker being located in position to act on the fruit of each grade passing from the grader to a sizer.

7. Apparatus for successively and continuously grading, marking, and sizing citrous fruit, comprising means for causing the fruit to travel from the grader to the sizer, and a fruit marker intermediate the grader and the sizer.

8. Apparatus for successively and continuously grading, marking, and sizing citrous fruit, comprising a fruit sizer having a throat, a marking machine mounted to act on fruit passing said throat, and means for delivering graded fruit to said throat.

9. Apparatus for successively and continuously grading, marking, and sizing citrous fruit, comprising a fruit sizer having a throat, a marking machine removably mounted in said throat, and means for delivering graded fruit to said throat.

In testimony whereof I have affixed my signature.

ARTHUR B. HALE.

Witnesses:
Z. P. FREEMAN,
EUNICE HAEUBERLEN.